June 17, 1941.   J. JUERGENS   2,246,255
STEERING WHEEL
Filed June 8, 1938   4 Sheets-Sheet 1

Inventor:
John Juergens.
By Ames, Phiss, Olson & Mucklestrurger
Attys.

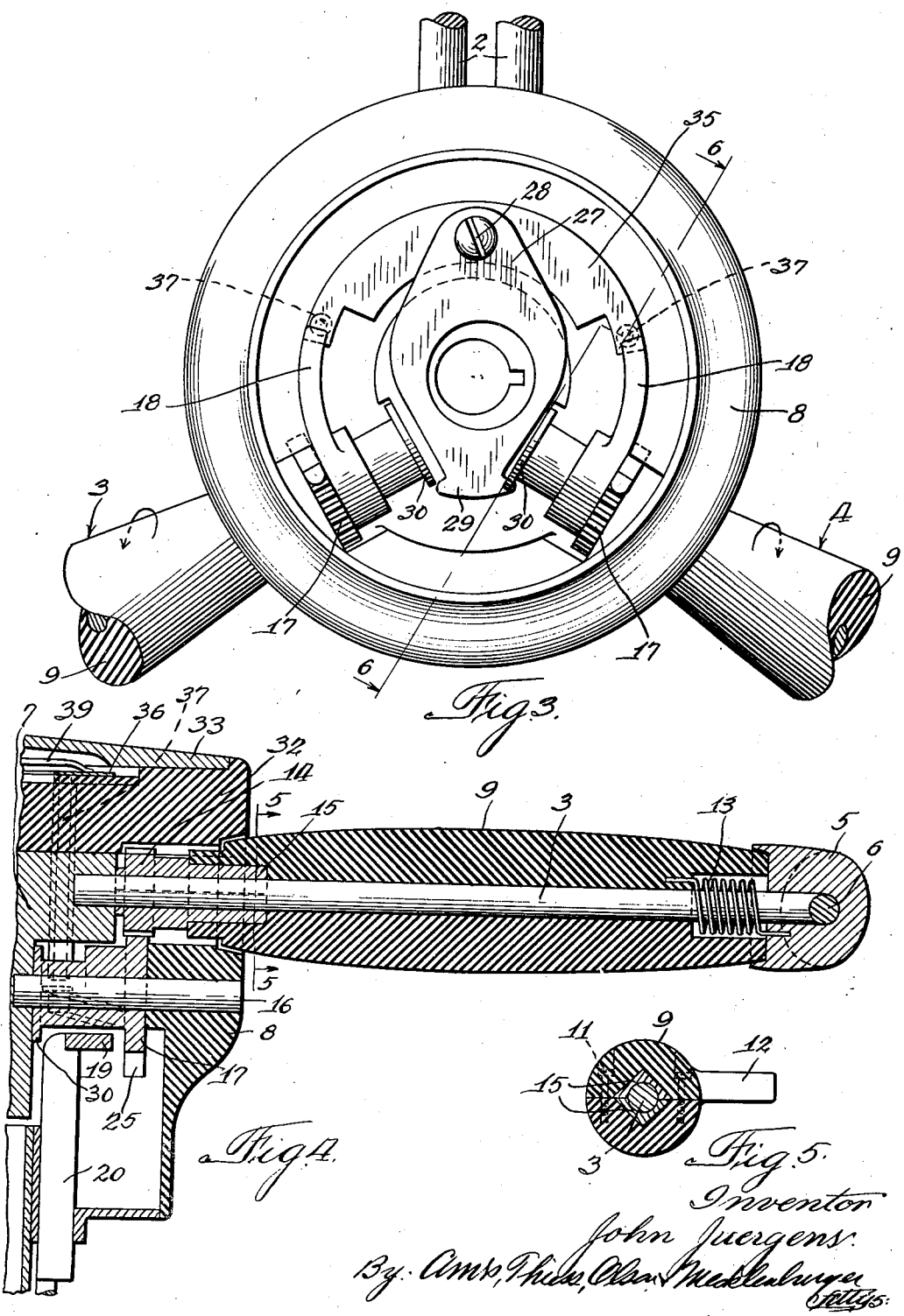

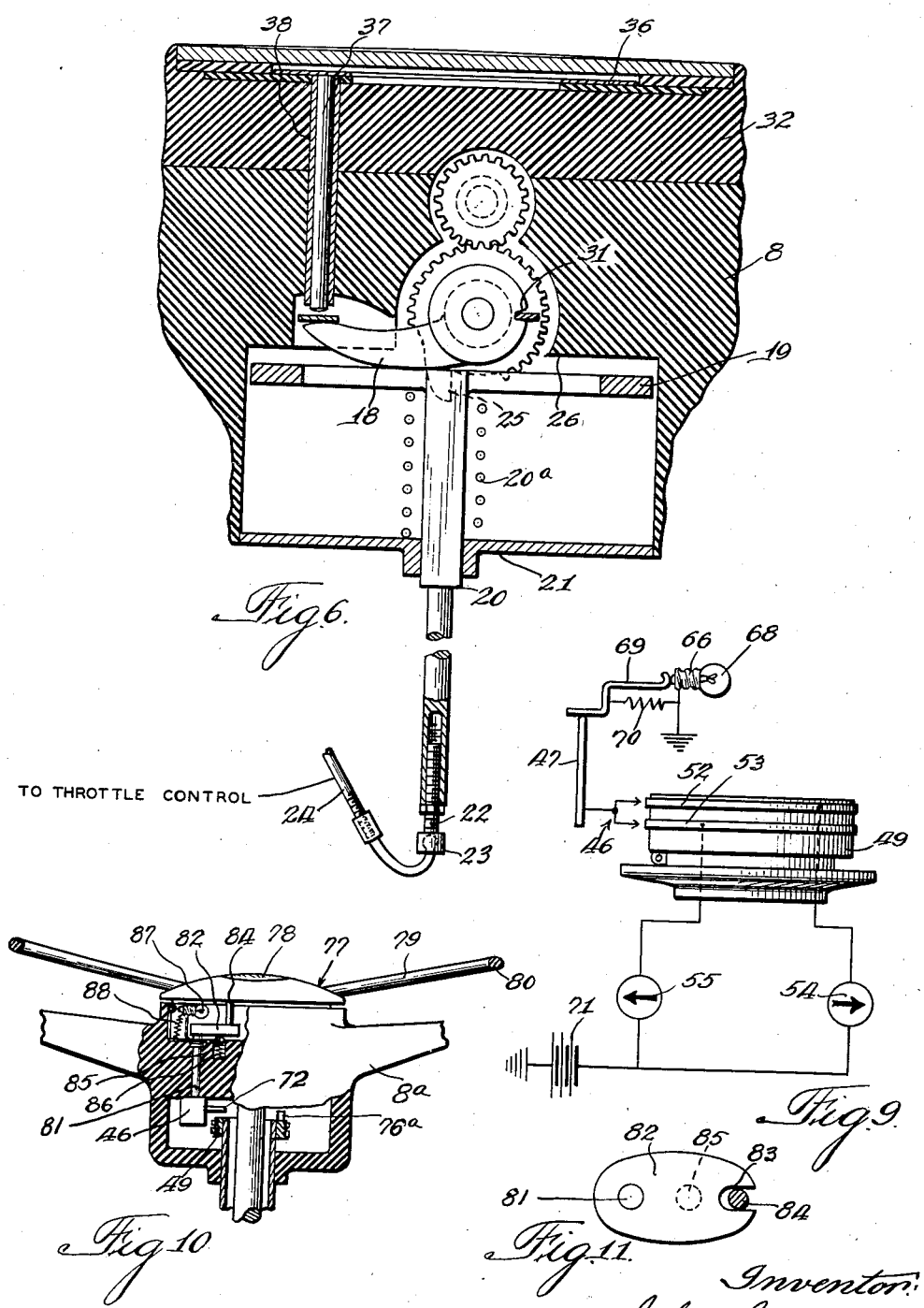

June 17, 1941.  J. JUERGENS  2,246,255
STEERING WHEEL
Filed June 8, 1938  4 Sheets-Sheet 4

Inventor:
John Juergens.
By Amso, Phiess, Olsen & Mecklenburger attys.

Patented June 17, 1941

2,246,255

UNITED STATES PATENT OFFICE 2,246,255

STEERING WHEEL

John Juergens, Chicago, Ill., assignor of seven per cent to Louis G. Bunker, Chicago, Ill.

Application June 8, 1938, Serial No. 212,444

4 Claims. (Cl. 177—339)

This invention relates to automobile steering wheels and more particularly to steering wheels having means associated therewith adapted to control various functions of an automobile such as the throttle, horn, signal lights, etc.

It is an object of the invention to provide means whereby predetermined operations, either in automobile control or in signaling, may be controlled in a convenient manner while retaining normal control of the steering wheel without changing the normal driving position of the hands.

A further object is the provision of means whereby various functions may be controlled by easy and natural movements of the driver and with a minimum amount of exertion which otherwise would be very tiring to the driver.

The invention also contemplates the provision of a device of the character described which may control various functions of the car and in which all of the mechanism for performing the various functions is enclosed substantially within the normal dimensions of the usual automobile steering wheel.

Another object is the provision of a turning signal operable from the steering wheel and which is automatically returned to neutral after the turn is made and which requires no attention from the driver after an initial setting for a predetermined direction is made. Provision is also made for indicating to the driver whether or not the signals are functioning properly.

It is also an object to provide a new and novel means for horn button control of signal lights or other direction indicating device.

The invention also provides a steering wheel of the character described which may be sold and applied as an accessory to replace the usual steering wheel or may originally be installed at the factory as standard equipment.

Further objects will be apparent from the specification and the appended claims.

In the drawings:

Fig. 3 is a bottom view of the embodiment illustrated in Figs. 1 and 2 removed from the steering post.

Fig. 4 is a longitudinal sectional view through one of the spokes of the wheel and a portion of the hub.

Fig. 5 is a transverse detail section through the spoke and taken on a line substantially corresponding to line 5—5 of Fig. 4.

Fig. 6 is a detail sectional view taken on a line substantially corresponding to line 6—6 of Fig. 3.

Fig. 9 is a diagrammatic view illustrating the electrical connections for the signals and pilot light.

Fig. 10 is an axial sectional view of another embodiment of the invention in which the turning signal is operated directly from the horn button.

Fig. 11 is a top view of the arm 82 shown in Fig. 10 with the operating pin shown in section.

As previously stated, the invention is adapted for the control of various functions of an automobile, particularly throttle control, the usual horn control, and the control of the usual direction signals, which latter are ordinarily mounted on trucks and passenger automobiles to indicate in advance the direction in which the vehicle will turn. The invention contemplates the embodiment of one or more of these controls in a single steering wheel unit.

Figure 1:
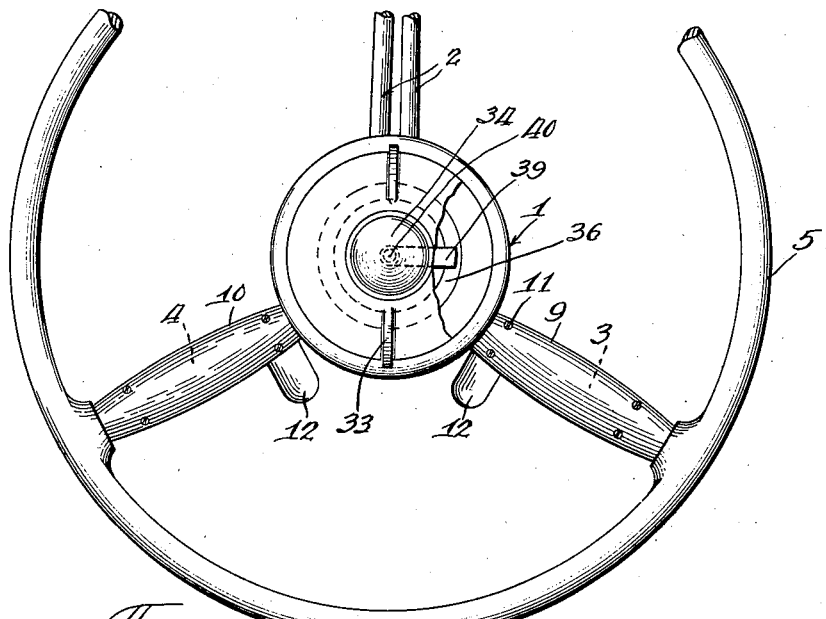
Figure 1 is a top plan view of a steering wheel illustrating one embodiment of the invention, portions being broken away for purposes of illustration.
Figure 2:
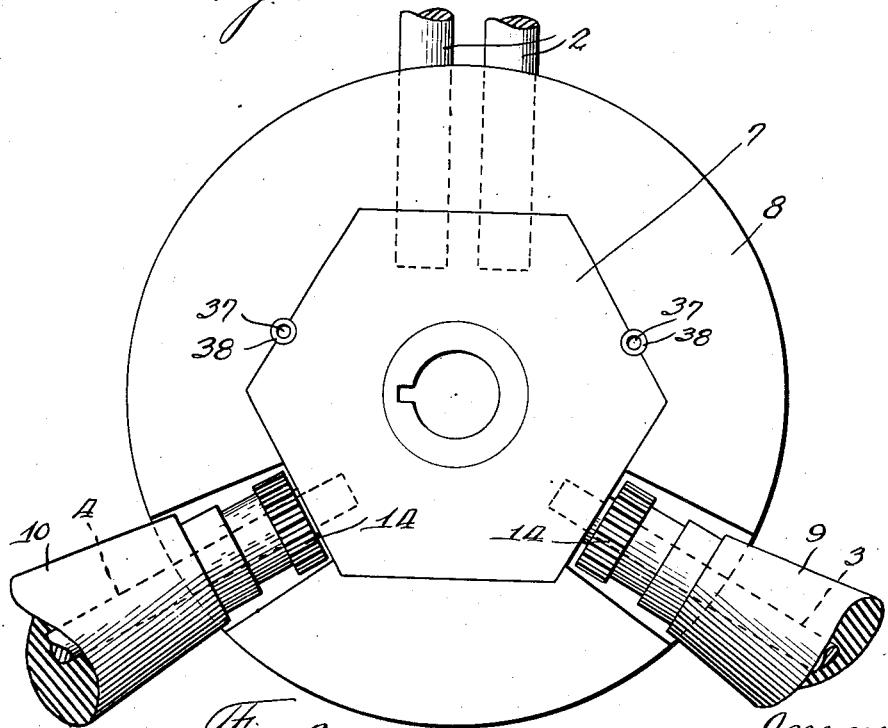
Fig. 2 is a top view of the steering wheel base or hub with the cover removed.

Referring particularly to Figs. 1 to 6, inclusive, the embodiment therein illustrated is adapted particularly for controlling the throttle of the usual automobile engine from the usual steering wheel. This embodiment comprises a steering wheel having the usual hub 1, spokes 2, 3, and 4, and rim 5. The rim 5 is preferably of insulating material and provided with a reinforcing member which may be in the form of a rod 6 to which the spokes are secured. These spokes are also preferably in the form of rods as shown and the inner ends of the spokes may be secured to a metallic bushing 7 (Fig. 2), which latter is molded into an insulating base 8 forming a part of the hub. The bushing 7 is preferably hexagonal as shown in Fig. 2, and the rim, spokes, and hub therefore form a substantially rigid steering wheel for mounting on the usual steering rod or tube which is enclosed in the usual manner in a steering post.

The spokes are rigidly secured in the hub and rim, and split hand grips 9 and 10 are rotatably mounted on the spokes 3 and 4, respectively. These hand grips are preferably of molded material and the two halves may be secured together by means of screws 11, one of the sections of each hand grip being provided with an outwardly extending thumb lug 12. A spring 13 is mounted on each of the spokes 3 and 4 and enclosed within its respective hand grip. The springs are arranged to engage the rim and grip and normally retain the hand grips in the position illustrated in Fig. 1, and return these grips to that position after they have been rotated and released by the driver.

The spokes 3 and 4 and the hand grips 9 and 10 and mechanism operated thereby are substantially identical. Therefore, a description of one of these mechanisms as illustrated in Fig. 4 will suffice for proper understanding of the mechanism.

A pinion 14 is rotatably mounted on the spoke or shaft 3 and provided with a rearwardly extending rectangular hub portion 15 which extends into a corresponding rectangular opening in the handle or grip as shown in cross section in Fig. 5. This pinion 14 and its associated outwardly extending hub is preferably split as shown, whereby it may be easily assembled on the spoke and retained in operating position by means of the split handle. A short transverse shaft 16 is supported in the base 8 and bushing 7, and a gear 17 is rotatably mounted thereon in mesh with the pinion 14 and provided with an outwardly extending cam portion 18 (Figs. 3 and 6). The cam arms 18 on each gear extend forwardly as shown in Fig. 3 and each arm is positioned for engagement with an axially movable ring 19 forming the head of a rod 20. This rod may be positioned inside the steering post or may be supported parallel therewith and guided by means of a suitable bracket 21 which is, in turn, attached to the steering post and may also provide a cover for the opening in the lower part of the hub as shown in Figs. 4 and 6. It will be apparent that, when either handle is rotated in the direction of the arrows, the cam 18 will be moved downwardly, and by its engagement with the ring 19 will move the control rod 20 downwardly.

The control rod 20 may be provided at its lower end with an adjustable coupling 22 and a universal joint connection 23 by which a rod 24, forming a part thereof, may be connected to any part of the throttle operating mechanism, such as the accelerator, or to any other suitable part, so that, when either spoke grip of the steering wheel is turned, the throttle or other control mechanism may be operated in the same manner as operation is controlled by the usual accelerator. The rod 20 and ring 19 thereon normally will be held in the raised position shown in Fig. 6 by means of the usual accelerator controlling spring. However, when other types of gas connections are made, the rod 20 may be retained in the normal raised position shown by means of a spring 20a. The gears 17 may be segmental in form, as it is only necessary for it to turn a part of a revolution. Each of these gears is provided with a downwardly extending lug 25, which, when the handle is turned, contacts with a surface 26 on the base 8 to thereby limit the downward movement of the cam 18.

Most modern cars steer very easily, and it is common practice for the driver to rest at least one hand on one of the spokes, as this provides an easy and comfortable position in driving. By means of the construction just described, it is only necessary to turn either one of the hand grips in the direction of the arrows in order to easily control the accelerator. The thumb lugs 12 are not essential. However, they provide means for convenient manipulation of the grips without turning the hand, as it is only necessary to release a grip and press the lug downwardly with the thumb. As soon as the grip is released, it will return to the normal position, which corresponds to the motor idling position of the usual accelerator.

It has been found desirable to provide means whereby only one hand grip may be rotated at one time. That is, as soon as one grip is rotated even slightly from its normal position, it is then impossible to turn the other grip. This may be accomplished by means of the equalizing mechanism illustrated in detail in Figs. 3 and 6.

An oscillatable lever 27 is pivoted at 28. This lever is preferably of sheet metal having its forward end shaped as shown at 29 and extending between disks 30, each of which is secured to or forms a part of the hub of each gear 17. Each of the disks is provided with a notch 31 (Fig. 6) and the end of the lever 27 will normally be positioned in one of these notches, thereby enabling the other disk to be freely rotated by its corresponding hand grip. The end 29 of the lever is of such size that, when either disk is rotated, the end of the lever will be forced into the notch of the other disk and will be retained therein, preventing turning of the corresponding hand grip until the first disk is returned to its normal position. It will therefore be apparent that only one of the grips may be used at one time for throttle control and that either disk may be turned from its normal position at any time when the other disk is in normal position. The notch 31 acts as a cam on the lever 29 so that, whenever one of the control grips is turned, the lever is moved into the notch of the opposite controlling disk.

An upper base 32 is mounted on the base 8 and covers the mechanism just described. This cover 32 may be metal or insulating material as desired, and the usual rotatable light switch 33 may be mounted thereon in the usual manner. Also, the usual horn button 34 may be provided. As previously stated, the hand grips 9 and 10 are normally held in neutral position as shown by means of the springs 13. These grips may be rotated in the direction of the arrows to control the throttle or may be slightly moved in the opposite direction to operate the horn independently of the horn button if desired, or the usual horn button 34 may be operated. In order that the movement of the grips in the opposite direction may control the horn, a flat spring contact member 35 is secured to the base 8 by means of the pivoted screw 28 of the locking lever 27. The contact 35 provides a suitable means for grounding the horn button circuit when either of the grips is rotated in the direction opposite to that which controls the throttle. The free ends of the contact spring 35 engage the ends of the cam arms 18 (Figs. 3 and 6) and, together with the springs 13 in the grips, normally retain the cams and associated grips in the neutral position.

In order to ground the horn circuit when the cams are moved in a direction to operate the horn, a conductor ring 36 (Figs. 4 and 6) is mounted on the upper base 32 and insulated therefrom and provided with a pair of downwardly extending electrical conducting rods 37 which may extend through suitable insulating bushings 38, and one of these conducting rods terminates immediately above a corresponding end of the contact spring 35. It will be apparent that, when either of the cams is moved upwardly by corresponding backward rotation of the grip, the conductor ring 36 will be grounded by contact of the spring 35 with a conductor rod 37. A brush 39 may be secured to the usual center contact terminal 40 leading to the horn and which is supported in the usual manner on the steering post and ordinarily does not turn with the wheel. It will, therefore, be clear that the brush 39 will maintain a suitable electrical contact with the conductor ring 36 during all movements of the steering wheel and that the horn circuit may be grounded either by the usual horn button or by either of the hand grips, with the wheel in any angular position.

Figure 7:
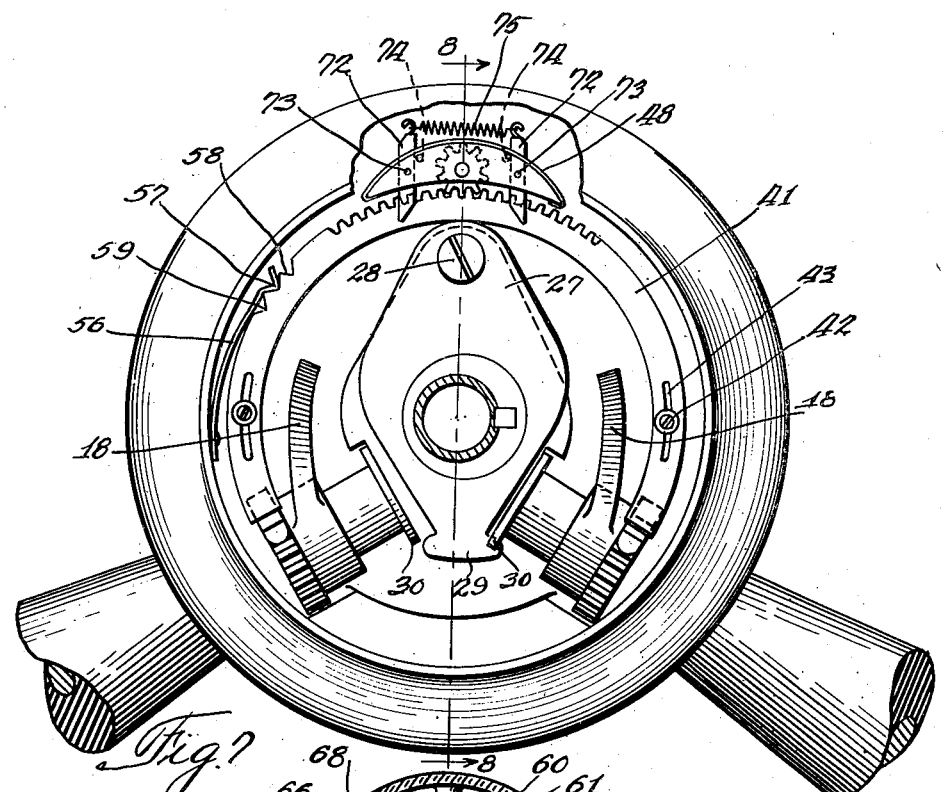
Fig. 7 is a bottom view, partly broken away, of an embodiment arranged to control turning signal lights, throttle, and horn, and to illuminate the horn button whenever the signal lights are operated.
Figure 8:
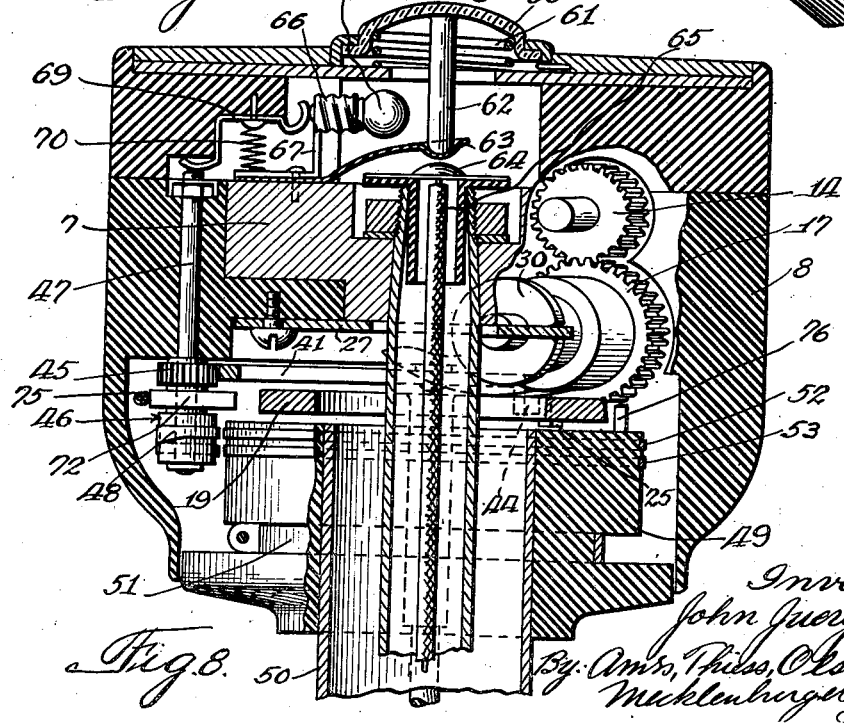
Fig. 8 is an axial sectional view taken on a line substantially corresponding to line 8—8 of Fig. 7.

The embodiment illustrated in Figs. 7 and 8 includes in the combination a suitable turning-signal control, and the horn control by the grips is omitted. The circuit for the turning signal is illustrated diagrammatically in Fig. 9. The gas control or so-called throttle control may be substantially identical with the embodiment previously described and, in order to provide a suitable right and left turning-signal control, an arcuate rack member 41 is oscillatably mounted on the under side of the base 8 by means of screws 42 extending through slots 43 in the rack member, whereby this rack may have a limited range of arcuate movement. The ends of the rack are turned downwardly to provide shoulders 44, and these shoulders are positioned closely adjacent the downwardly extending stop lugs 25 on the gears 17. Therefore, when either of these gears is turned rearwardly, that is, in a direction opposite to the movement for gas control, the corresponding lug will engage the downturned end 44 of the arcuate rack 41 and the rack will be correspondingly moved.

A pinion 45 is in mesh with the rack 41 and this pinion is secured to an insulating switch base 46. The switch base is in turn mounted for oscillation on a shaft 47 which extends upwardly through the base 8 of the steering wheel hub. The insulating base 46 of the switch is provided with an elongated contact member 48 having a suitable electrical connection with the shaft 47, but otherwise insulated from all operating elements on the shaft. It will be apparent that, when the oscillating rack 41 is moved in either direction by movement of the hand grips, the pinion 45 meshing therewith will cause the switch base 46 and contact 48 thereon to be similarly oscillated.

An insulating base 49 is rigidly mounted on the steering post casing 50. This base is preferably in the form of a split cylindrical insulating member which may be secured to the steering post casing by means of a clamping ring 51. The base 49 is provided with spaced contact rings 52 and 53 which are electrically connected to the direction signals in the manner indicated diagrammatically in Fig. 9, in which the electrical circuit is disclosed for controlling right and left turning signals 54 and 55. The ends of the switch contact member 48 are offset in such a manner that, when the switch is oscillated in one direction, the member 48 will electrically contact the ring 52, and when it is oscillated in the opposite direction it will electrically contact the conductor ring 53. Therefore, by predetermined oscillatory movement of the switch member, a corresponding right or left signal light 54 or 55 or other signalling device may be controlled. It will be apparent that, by means of the construction previously described, the forward rotation of the right-hand spoke grip may cause illumination of the right-hand turning signal 54, and a similar movement of the left-hand spoke grip may cause illumination of the left-hand turning signal 55.

The switch 46 is normally retained in neutral position by means of a spring 56 (Fig. 7), the end of which is engaged in a notch 57 in the rack. When the rack 41 is moved in one direction to energize a corresponding turning signal, the spring 56 will engage in a notch 58, and, when the switch is moved in the opposite direction to energize the opposite turning signal, the spring will be engaged in a corresponding notch 59. It will, therefore, be apparent that, when the device is operated to illuminate any particular signal, the switch will retain electrical connection until the rack is again moved to reset the switch to neutral position. It will be understood, of course, that signal arms or other devices may be used instead of lights to indicate direction, and solenoids may be energized by operation of the switch to control such devices instead of the usual signal lights. As previously stated, the contactor 48 of the switch is electrically connected to the shaft 47 which secures the switch to the base 8. This shaft 47 extends upwardly through the base as shown and may be electrically grounded in any suitable manner.

In the embodiment illustrated in Fig. 8, means is provided for illuminating the cap of a horn button 60 which may be mounted on the wheel in the usual manner, and in the present instance is more or less translucent whereby it may be illuminated by a pilot light positioned underneath the cap. The button cap is normally retained in position by means of a spring 61 and provided with a downwardly extending portion 62 contacting a grounded spring 63 which may be grounded on the bushing 7 as shown. It will be apparent that pressure on the cap 60 will cause the grounded spring 63 to contact with the usual center contact 64 which forms a terminal for the usual conductor 65, forming a part of the horn circuit. Therefore, when the button is operated, the conductor 65 will be grounded to operate the horn.

In order to illuminate the button 60, a small electrical socket 66 is mounted on the grounded bracket 67 as shown and may be provided with a bulb 68. A spring center contact 69 is arranged to connect the center contact of the bulb with the shaft 47 of the signal light switch 46. The bulb 68 requires very little current, while the signal lights require considerable current for the proper operation. Therefore, a resistance 70 is provided between the center contact member 69 and the grounded bracket 67 whereby sufficient current may flow to ground for operating the signal light and only sufficient current will flow through the illuminating bulb 68 to sufficiently illuminate the button 60 when either of the signal lights is in operation. It will be apparent that the horn button may be of the usual type and a small lens or window may be provided at any desired location on the wheel whereby the pilot light may indicate to the driver whether or not the signals are functioning properly. The wiring for illuminating the horn button and for operation of the signal lights is fully illustrated diagrammatically in Fig. 9, and the circuit is of course connected to the usual battery 71 and grounded as illustrated.

In order to reset the switch 46 after a predetermined right or left-hand turn has been made, pawls 72 are pivoted at 73 on the insulating switch base 46. These pawls normally rest against stops 74 against which they are retained by means of a spring 75, so that the pawls normally stand substantially in the position shown in Fig. 7. When the switch is oscillated to contact one of the contactor rings 52 or 53 and operate a corresponding signal to indicate a proposed right or left turn, a corresponding pawl 72 is moved inwardly so that it will be engaged by an upwardly extending pin 76 projecting from the fixed base 49 (Fig. 8). Therefore, when the wheel is turned in the direction indicated by the signal, the pawl spring 75 will enable the projecting pawl to freely pass the pin 76; and when the wheel is turned in the other direction—that is, to straighten out after the turn is completed— the pin 76 will engage the angular side of the pawl 72, which is held against pivotal movement in one direction, and cause the switch to be returned to its normal position. The consequent rotary movement of the switch shaft 47 and the pinion 45 thereon returns the rack 41 to neutral position.

Figs. 10 and 11 disclose an embodiment in which the turning signal is operated directly from the horn button for indicating the turn and is returned to normal position by the mechanism just described. This embodiment comprises the ordinary steering wheel having a hub 8a on which is mounted a ring type horn button comprising a cap 77 which may be made entirely of translucent or transparent material or may have a portion 78 therein which enables light to be transmitted therethrough. The horn button is of the so-called ring or wheel type provided with outwardly extending arms or spokes 79 which connect the button with a ring 80 of comparatively large diameter. This horn button rim or ring 80 is positioned within easy reach of the thumb of the driver when the hand is resting on the steering wheel. The button 77 is operated in the usual manner by pressure of the thumb on the ring 80 to tilt the button. It is believed unnecessary to describe the details of the button construction.

In this embodiment the electrically controlled circuit for the turning lights may substantially be the same as that shown in Fig. 9, and the conductor ring base 49 and switch 46 may also be of similar construction except that the pinion 45 and control means therefor is omitted. The switch is rigidly secured to an oscillatable shaft 81 which extends upwardly through the insulating hub 8a and is provided at its upper end with an arm 82 secured thereto, a top view of the arm being shown in Fig. 11. This arm is provided with a slot 83, and the button 77 is provided with a downwardly extending pin 84 engaging in this slot, whereby a slight turning movement of the button will cause the switch member 46 to be oscillated in a corresponding direction to cause a predetermined contact with one of the conductor rings 52 or 53. In order to retain the switch in its normal position or in any adjusted position, a ball detent 85 is positioned in the base 8a and retained in a depression in the arm 82 by means of the spring 86.

The operation of the device is identical with the embodiment previously described, with the exception that the switch is operated by a turning movement of the button 77 instead of by a hand grip or spoke. A small electric light bulb 87 is mounted in the base as shown, and the socket arranged to receive this bulb may be grounded in the same manner as described for the bulb 68, and a grounded resistance 88 is connected to the switch shaft 81. In this manner an electric circuit is provided which may be identical with that shown in Fig. 9, and the signal lights may be effectively controlled by turning the horn button without interfering with the normal tilting operation of the button. Also, the pin 76a on the ring contactor base 49 will reset the switch in the same manner as previously described.

Modifications may be made without departing from the spirit of the invention. It is desired, therefore, that the invention be limited only by the prior art and the scope of the appended claims.

Having thus described this invention, what is claimed and desired to be secured by Letters Patent is:

1. A direction signal control for an automobile comprising a steering wheel having the usual radial spokes, a pair of circuit controlled turning signals on said automobile, fixed terminals for said signals adjacent said wheel, an electrical switch carried by said wheel for selectively completing either signal circuit, rotatable hand grips on the two spokes normally adjacent the driver, means whereby selective rotary movement of said grips will cause a corresponding operation of said switch and an associated signal to indicate a subsequent right or left turn, means to automatically return said switch to normal after completion of said turn, a pilot light connected to said circuit to indicate the effective operation of either signal, and means co-operating between said grips to prevent effective operation of more than one hand grip at one time.

2. A direction signal control for an automobile comprising a steering wheel having the usual radial spokes, a pair of circuit controlled turning signals on said automobile, fixed terminals for said signals adjacent said wheel, an electrical switch carried by said wheel for selectively completing either signal circuit, rotatable hand grips on the two spokes normally adjacent the driver, means whereby selective rotary movement of said grips will cause a corresponding operation of said switch and an associated signal to indicate a subsequent right or left turn, means to automatically return said switch to normal after completion of said turn, a movable gas control member associated with said wheel, means whereby movement of either hand grip in the opposite direction will operate said gas control member, and means co-operating between said grips to prevent effective operation of more than one hand grip at one time.

3. In an automobile having two relatively movable members, said members comprising a rotatable steering member closely associated therewith and a fixed member, a switch adapted to control turning signal circuits, an oscillatable element on one of said members for controlling said switch, a pair of oppositely disposed ratchet pawls resiliently mounted in opposed operative relation on said oscillatable element, manual means to move said switch to either of two circuit selecting positions and simultaneously extend one of said pawls more than the other, means on the other of said relatively movable members to cooperate with the extended pawl when the rotatable steering member is returning to normal position after a turn is made to cause said pawls and switch to return to normal non-cooperative neutral position.

4. In an automobile having two relatively movable members, said members comprising a rotatable steering member and a fixed member closely associated therewith, a switch adapted to control turning signal circuits, an oscillatable element on said rotatable member for controlling said switch, a pair of oppositely disposed ratchet pawls resiliently mounted in opposed operative relation on said oscillatable element, manual means to move said switch to either of two circuit selecting positions and simultaneously extend one of said pawls more than the other, means on said fixed member to co-operate with the extended pawl when the rotatable steering member is returning to normal position after a turn is made to cause said pawls and switch to return to normal non-co-operative neutral position.

JOHN JUERGENS.